United States Patent Office 2,970,999
Patented Feb. 7, 1961

2,970,999
N-AMINOEMETINIUM COMPOUNDS

Bernard Rudner, Pittsburgh, Pa., assignor to W. R. Grace & Co., New York, N.Y., a corporation of Connecticut No Drawing. Filed Mar. 20, 1959, Ser. No. 800,623

6 Claims. (Cl. 260—270)

This invention relates to bridgehead nitrogen compounds. In one specific aspect, it relates to derivatives of ipecac alkaloids which may be called N-aminoemetinium compounds. This application is a continuation-in-part of my co-pending applications S.N. 547,831, filed November 18, 1955 now U.S. Patent 2,891,060.

A bridgehead nitrogen compound is an organic compound, the molecular structure of which contains at least two mutually fused rings sharing a common nitrogen atom (the bridgehead nitrogen) and at least one other atom. Certain ipecac alkaloids contain such a structure. It has been discovered that N-aminoemetinium compounds exhibit amebicidal properties and possess other desirable attributes such as diminished toxicity and increased alkali stability.

It is, therefore, an object of the present invention to provide a new class of pharmacologically useful compounds.

The compounds of my invention are suitably prepared by the action of chloramine on the appropriate bridgehead nitrogen compound. In the preferred practice of my invention, the reactant amine dissolved in an unreactive solvent is exposed to a stream of gaseous chloramine. The resultant N-aminoemetinium chloride is isolated by conventional laboratory techniques. Compounds containing anions other than chloride are prepared by metathesis, starting with the chloride and a compound containing the anion to be introduced.

In accordance with the present invention, I have made available a new class of compounds and their mineral acid salts having the general formula:

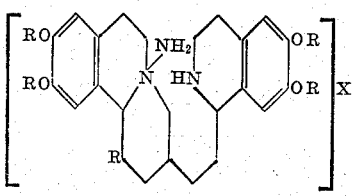

where R may be hydrogen or lower alkyl and X is an anion.

When my compounds are used for pharmaceutical purposes, X must be a pharmaceutically acceptable anion. The primary attributes of such an anion are nontoxicity and pharmaceutical compatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gentisate, malate and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. 1, 59 (1939). Alternatively, the chloramine can be formed in the presence of the amine as described in the copending application Serial No. 605,230 filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene and the like; ethers, e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and cellusolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds continanig anions other than chloride or sulfate by metathesis. Many of the anions described supra can be obtained by mixing aqueous solutions of the hydrazinium chloride with appropriate re- agents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

The presence of the hydrazinium function on the molecule does not affect the ability of the secondary amine function also present to form salts with mineral acids. Sometimes the acid salts of my novel compounds are isolated directly being formed during the course of the same reaction that created the hydrazinium linkage. For example, the ammonium chloride present from chloramine formation and/or decomposition may react with the product to form the hydrochloride salt as in Example I and illustrated in Example II. These mineral acid salts come within the scope of my invention as do similar salts, i.e., the acid sulfate, the hydrobromide, the acid phosphates, etc.

The bridgehead tertiary amines suitable as starting materials for the preparation of my novel compounds are mostly naturally occurring constituents of ipecac. The best known members of this family include emetine and cephaeline. My novel compounds exhibit amebicidal activity but are more stable to alkaline conditions than the starting tertiary amine or its salts. In addition, my compounds possess diminished toxicity.

The scope and utility of my invention is further illustrated by the following examples:

*Example I*

Twenty-five grams of emetine hydrochloride was dissolved in chloroform, converted to the free amine with base and reacted with a stream of gaseous chloramine from the generator previously discussed. After separation from the ammonium chloride formed, the filtrate was evaporated to dryness leaving a residue of 25.8 g. Fractionating of the residue by repeated recrystallizations from methyl alcohol-ethyl acetate gave the more soluble N-aminoemetinium chloride as a solid melting 204–206° C. and 99.3% pure by chloride analysis and the less soluble N-aminoemetinium chloride hydrochloride melting 210–215° C.

*Example II*

A small portion of the hydrochloride of Example I was dissolved in chloroform and shaken with some aqueous sodium hydroxide. The organic layer was separated, dried and evaporated to yield N-aminoemetinium chloride melting 204–205° C. as the product identical with that of Example I. The experimental results are summarized in the reaction scheme presented below:

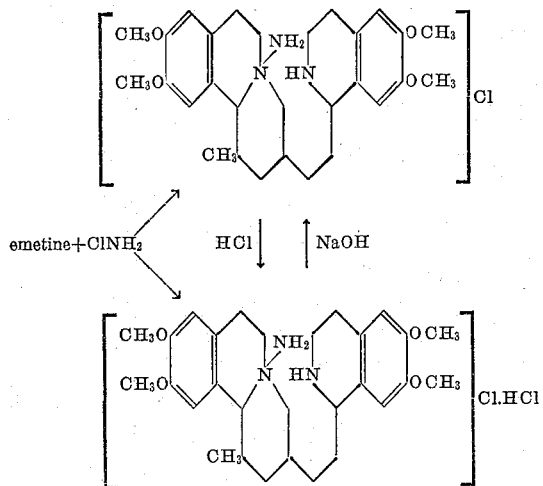

*Example III*

Treatment of a small portion of N-aminoemetinium chloride (or its hydrochloride) dissolved in water with a concentrated aqueous solution of picric acid gave N-aminoemetinium picrate as a yellow solid melting at 160° C.

*Example IV*

A small portion of N-aminoemetinium chloride dissolved in water was treated with a concentrated aqueous solution of potassium tetraiodobismuthate. The resultant precipitate of N-aminoemetinium tetraiodobismuthate was a black graphite-like solid melting with decomposition at about 65° C.

I claim:

1. N-aminoemetinium compounds selected from the group consisting of compounds having the formula:

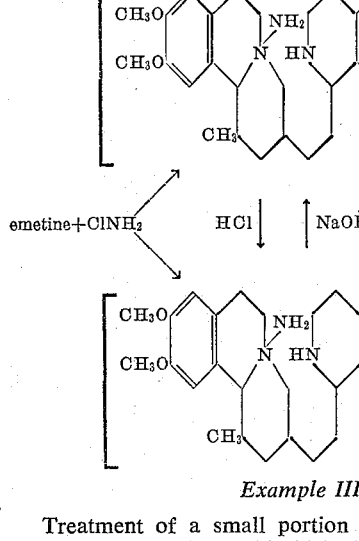

wherein each R is independently selected from the group consisting of lower alkyl and hydrogen and X is a pharmaceutically acceptable anion, and their non-toxic mineral acid addition salts.

2. Compounds having the structure of claim 1 where each R is lower alkyl.

3. N-aminoemetinium chloride.

4. N-aminoemetinium chloride hydrochloride.

5. N-aminoemetinium tetraiodobismuthate.

6. N-aminoemetinium picrate.

No references cited.